United States Patent [19]
Johnson et al.

[11] 3,850,089
[45] Nov. 26, 1974

[54] FOOD PROCESSING SYSTEM

[75] Inventors: Edward A. Johnson, Chicago; Wendelin H. Miedaner, Homewood; Warren E. Larson, Downers Grove, all of Ill.

[73] Assignee: Swift & Company, Chicago, Ill.

[22] Filed: Feb. 5, 1973

[21] Appl. No.: 329,325

Related U.S. Application Data

[62] Division of Ser. No. 85,370, Oct. 30, 1970.

[52] U.S. Cl. ........................ 99/483, 99/362, 99/486
[51] Int. Cl. ............................................... A23l 3/04
[58] Field of Search ............ 99/361, 362, 483, 486, 99/487, 493

[56] References Cited
UNITED STATES PATENTS

| | | |
|---|---|---|
| 2,010,667 | 8/1935 | Herold et al. .......................... 99/362 |
| 2,348,440 | 5/1944 | Smith, Jr., et al. .................... 99/361 |
| 2,709,139 | 5/1955 | Voytilla ........................... 99/361 UX |
| 2,870,024 | 1/1959 | Martin ............................... 99/483 X |
| 2,909,986 | 10/1959 | Beauvais .............................. 99/361 |
| 3,161,526 | 12/1964 | Mencacci .......................... 99/361 X |
| 3,702,583 | 11/1972 | Rullman .......................... 99/486 UX |

Primary Examiner—John Petrakes
Attorney, Agent, or Firm—Edward T. McCabe; Charles E. Bouton; W. C. Davis

[57] ABSTRACT

Filled containers are loaded into carriages, provided with individual cells for carrying a given number of containers, and the carriages are transported through first and second bodies of liquid wherein the containers are first heated for a regulated time while passing at a selected speed through a plurality of temperature controlled zones, and then chilled. Thereafter the containers are unloaded from the carriages into cartons and the carriages are returned for loading.

6 Claims, 6 Drawing Figures

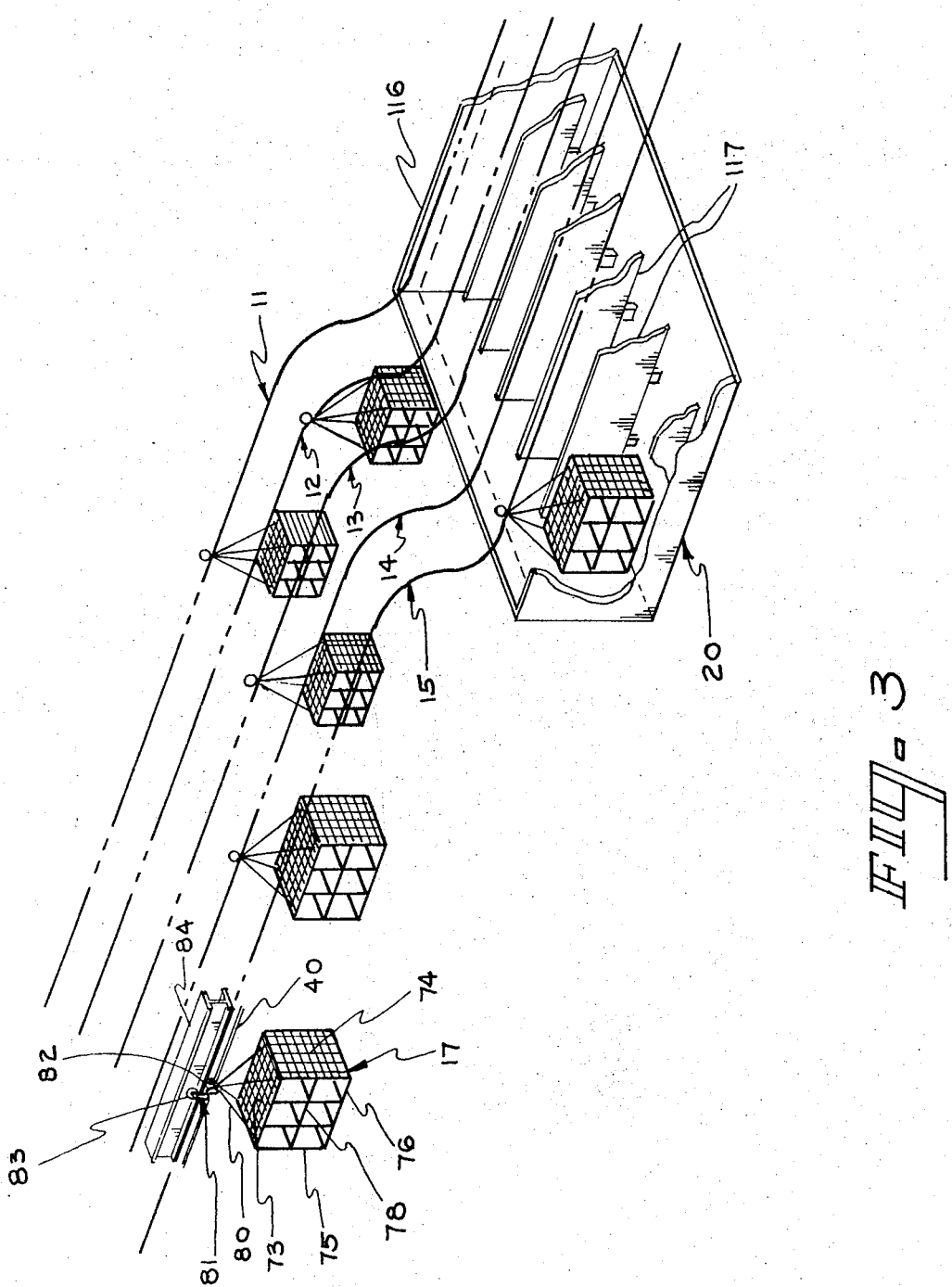

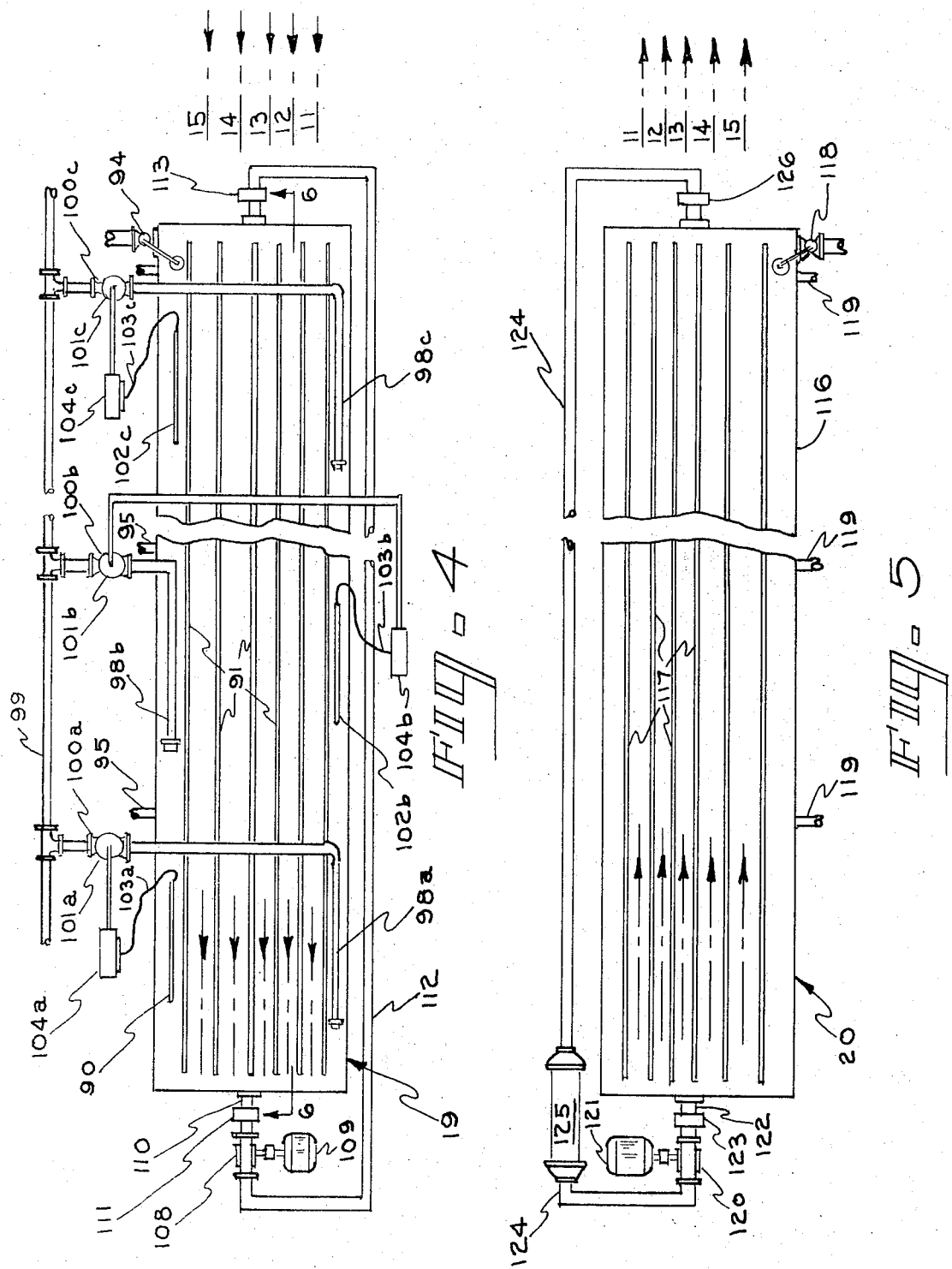

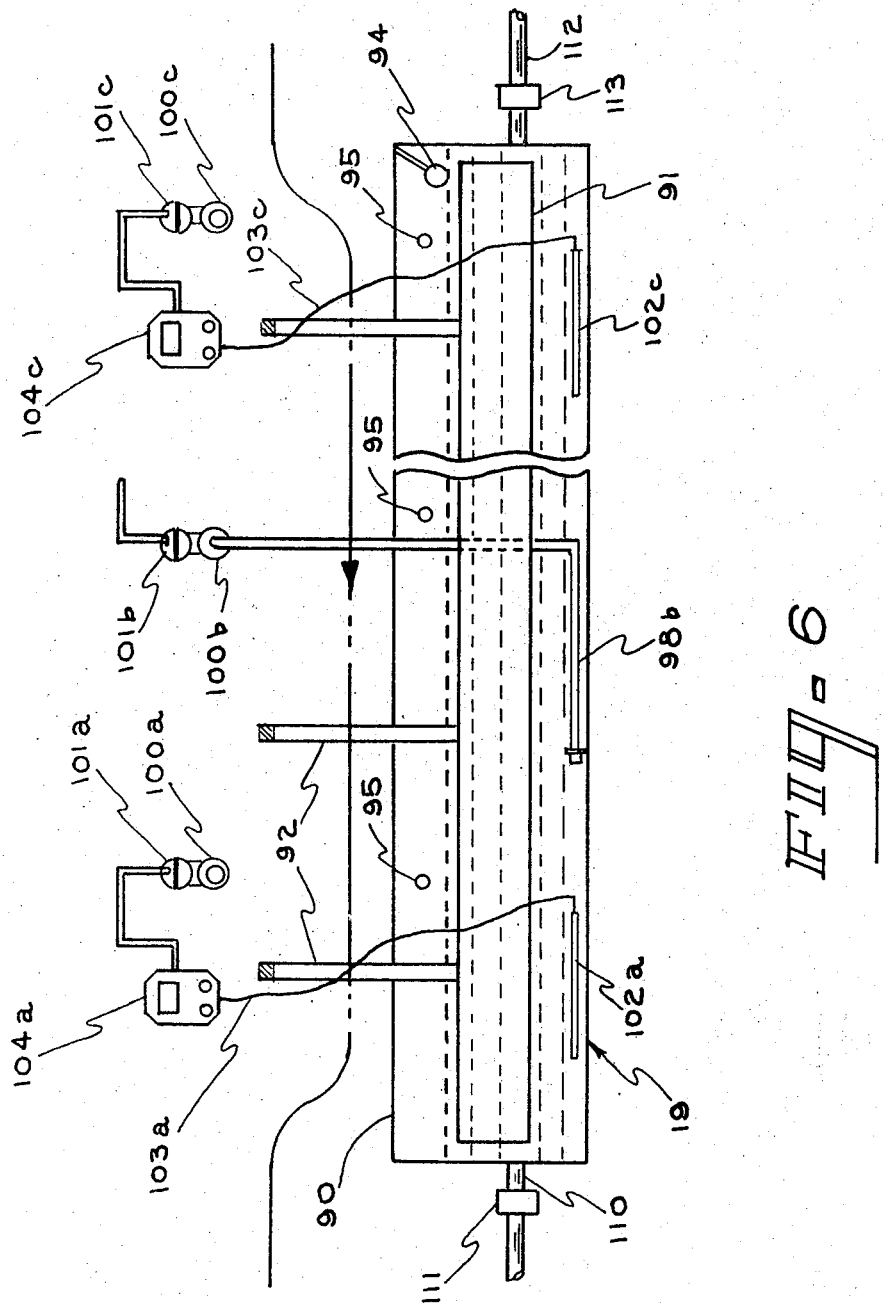

FOOD PROCESSING SYSTEM

This is a division, of application Ser. No. 85,370, filed Oct. 30, 1970.

This invention relates to the thermal processing of food items; and more specifically pertains to the continuous processing of canned foods to provide same with a desired degree of heat processing.

Food items are often heat-processed to achieve a degree of shelf stability. Most products of this type are packaged in cans, usually cylindrical, but substantial quantities are also packaged in glass containers and, more recently, in plastic pouches and the like. Most of these products are heated to a high temperature (usually 250° F. and higher) for a sufficient period of time to sterilize the product so as to withstand indefinite storage at room temperatures. Such processing has been heretofore accomplished in batch quantities where the cans or glass containers, and the like, are assembled in large vessels which are heated while under superatmospheric pressure. Continuous sterilizing treatment of such items has also been developed, wherein such cans are progressively passed through a heated pressurized tank by either a reel which rolls the cans during treatment, or by carriers on serpentine conveyors. Such continuous processing has heretofore been justified only where very high volumes of single container sizes have been involved and where high treatment temperatures have been required. Furthermore, special precautions have had to be taken with containers less resistant to damage than metal cans.

There are, however, a number of food items that are customarily subjected to a less severe heat treatment so as to be shelf stable for only a limited time and sometimes only when stored under refrigerated conditions. Moreover, a number of such products have been traditionally packed in a variety of sized and shaped containers. For instance, hams, ham products, and other meat items are often packaged in "pear-shaped" and rectangular form cans as well as in cylindrical cans. Recently there has been a tendency to substitute less durable plastic materials for the metal in such cans or containers. These items have heretofore been processed mainly in batches in large vessels which have been heated to appropriate temperatures at atmospheric pressures and held for substantial periods of time.

Batch processing requires a large investment in a number of such vessels and requires substantial time and labor for both loading and unloading in addition to the time required for heat processing. Furthermore, the heat transfer conditions in batch treating are not optimum in that the conditions throughout a loaded vessel are not uniform; and the treatment must be based upon the worst conditions present, resulting in some of the product being overtreated.

Accordingly, it is an object of the present invention to provide an improved method and apparatus for continuously thermal processing packaged food items.

It is another object of the present invention to provide an improved method and apparatus for continuously thermal processing food items packaged in various types and shapes of containers, including noncylindrical containers, and capable of concurrent processing of containers of more than one shape or size.

It is still another object of the present invention to provide an improved method and apparatus for continuously thermal processing packaged food items under uniform conditions.

In general, the present invention contemplates the loading of packaged food items onto carriers which are continuously conveyed through a closed path at a controllable constant speed through first and second bodies of liquid which are maintained at suitable temperatures and wherein the speed at which the items are conveyed is regulated to obtain desired thermal levels during passage through said bodies of liquid.

A system of apparatus devised for effecting the process includes an endless carrier trained in a closed path running through first and second elongated tanks, each being provided with means to control the temperature of bodies of liquid maintained in each tank, and a variable speed drive means connected to move the endless carrier.

Further objects and advantages of the present invention will become apparent upon reading the following detailed description in conjunction with the drawings wherein:

FIG. 3 is a partial perspective view of a portion of the apparatus of FIG. 1;

FIG. 4 is a detailed plan view of a portion of the apparatus of FIG. 1 comprising the first tank;

FIG. 5 is a detailed plan view of a portion of the apparatus of FIG. 1 comprising the second tank; and FIG. 6 is a detailed elevation view taken in section at line 6—6 of FIG. 4.

Figure 1:
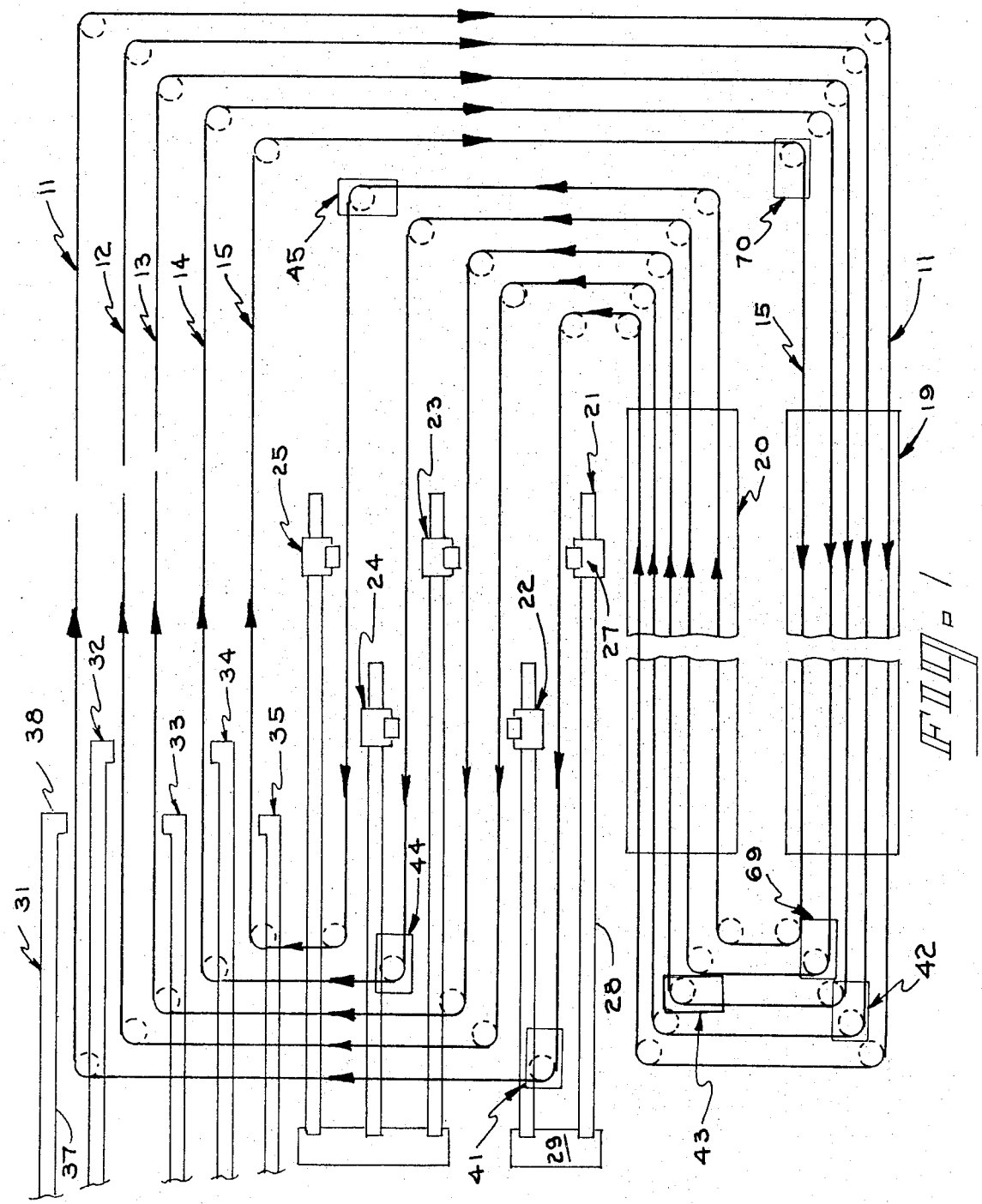
FIG. 1 is a diagrammatic plan view of the overall system of apparatus of the invention.

The present method involves the transporting of packaged items, such as meat items in containers, in small groups through treatment zones held at temperature conditions selected to achieve the required shelf stability of the item. The small groups of items represent a number selected to complete a given unit of such items, such as a carton, common to the trade. In practice these groups consist of six packages. Each group of items is placed in a carriage that is conveyed through a closed path at a controllable constant speed. A plurality of such carriages are continuously moved sequentially past a point where they are loaded and thence they are submerged and transported through the length of a body of heated liquid, usually water, along a first portion of the closed path. Thereafter the carriages (and packaged items carried thereby) are removed from the first body of heated liquid and thence similarly submerged and transported through a second body of chilled liquid (also usually water) through a second portion of the closed path.

It has been found necessary to confine the packaged items within the successive carriages while being transported through each of the bodies of liquid. This is because the packaged items are often found to have a tendency to float and hence to escape from the carriages if not confined therein. Suitable confinement can be provided by enclosing the path of the carriages through the bodies of liquid.

Also it is necessary to carefully control the temperature level of the heated liquid. Only by accurate control can it be assured that all of the product within each container will reach a required temperature level during the course of transport through the first body of liquid. Such control can be best accomplished by dividing the first body of liquid into a plurality of successive (longitudinal) zones and individually heating the liquid in each zone while continuously monitoring the temperature of the liquid in each zone so as to control the rate of application of heat thereto. A portion of the body of heated liquid is also continuously circulated and may be circulated in a direction concurrent to the movement of carriages and food items transported therein. The result is a thorough mixing of liquid so as to maintain a uniform temperature surrounding the carriages and packaged items throughout all portions of the plural zones, thereby providing for heat transfer into the packaged items under precise and uniform conditions.

By closely controlling the temperature conditions to which the packaged items are exposed, the precise time required to obtain a desired temperature level at the center of each item of product can both be calculated and confirmed by practice. Hence, the residence time required in the first body of liquid (heated body) can be established and the speed of transport of the carriages is regulated to provide that period of time for each carriage to traverse the length of the body of liquid. For example, to achieve a requisite temperature level of 155° at the center of product, it has been found necessary to transport 3 lb. cylindrical cans of ham for 120 minutes through water maintained at 170° F. Thus a transport speed of 2.5 feet per minute must be maintained through a tank 300 feet long.

Following the heating of the products, it is desirable to rapidly chill the items prepatory to storage or shipment. The chilling rate and level is not critical, however, for efficiency it is desired to reduce the temperature of each packaged item as much as possible before it is placed in a carton and refrigerated storage, as it is desirable to reduce the internal product temperature to about 50° F. in about 4 hours. Accordingly, the carriages with items are transported at the same speed, established to achieve satisfactory heat processing, through a second body of liquid which is chilled to about 40°F. as it is recirculated external of the tank. Temperature control within the second body of liquid is not critical and it has been found sufficient to simply chill the liquid as it is continuously recirculated countercurrent to the direction of movement of the carriages and product.

Following removal of the carriages and packaged items from the second body of liquid they are traversed across a distance allowing for the drying of the containers by dripping of liquid therefrom. Also, drying may be facilitated by directing streams of relatively dry air across the carriages. Finally, the packaged items are ejected from the carriages into cartons. Preferably the group of containers transported by a single carriage is ejected as a unit (all containers ejected simultaneously) into a carton sized to hold only that number of containers; and the carton is thereafter removed and sealed and passed to storage.

A preferred apparatus devised for performing the foregoing method is shown in FIGS. 1 through 6. For reasons of efficiency in handling large volumes of plural products it is preferred that such apparatus include a plurality of parallel or congruent closed paths which run through the first and second bodies of fluid and past unloading and loading stations. A preferred general plan or layout of the system of apparatus is shown in FIG. 1 wherein five endless overhead carriers generally 11, 12, 13, 14 and 15 are shown trained in parallel and congruent courses or paths. As may be seen in FIG. 3, each of the endless carriers 11 – 15, supports a plurality of evenly spaced carriages generally 17. The overhead carriers generally 11 – 15 support the respective carriages 17 at a uniform level above the plant floor so as to be easily accessible to operators, except where the endless carriers 11 – 15 are trained above the bodies of liquid in first and second tanks generally 19 and 20, respectively. At those locations the overhead carriers descend to a lower level so that the carriages 17 may be submerged beneath the level of liquid in each tank.

The first tank generally 19 is a cooking tank and provision is made to heat the liquid therein. The second tank generally 20 is intended for chilling the cooked items of product and provision is made for chilling the liquid maintained therein. Each of these tanks is elongated so as to enable a large quantitiy of product to be processed therein while continuously moving therethrough for periods of up to about 6 hours in each tank. In practice it has been found that these tanks must be about 300 feet long.

The endless overhead carriers generally 11 – 15 are also trained to pass above respective unloading stations generally 21, 22, 23, 24, and 25. Each such unloading station includes cartoning means generally 27 for removing packaged items from the carriages 17 and placing them in cartons, or the like, which are then removed on a conveyor generally 28 to assembly tables generally 29 where the cartons may be sealed and transferred to to storage or to shipment, etc.

The overhead endless carriers generally 11 – 15 are thence trained above respective loading stations generally 31, 32, 33, 34, and 35 where packaged product items arrive sequentially on delivery conveyors generally 37 at accumulation tables generally 38, from which the packaged items are transferred to the carriages 17 previously emptied at the corresponding unloading stations generally 21 – 25. From the loading stations generally 31 – 35 the endless carriers generally 11 – 15 transport the respective carriages 17 again to the first tank generally 19 for cooking of the packaged product items placed therein.

In practice the endless carriers generally 11 – 15 are powered to move continuously; and an operator attending each loading station 31 – 35 manually loads each carriage 17 while it is in motion. It is preferred that each carriage 17 be fully loaded with a complete group of packaged items as such group is selected to completely fill a carton at the respective unloading station generally 21 – 25. Accordingly, if for some reason, such as slow product arrival at the loading stations generally 31 – 35, a carriage 17 cannot be completely filled it is preferable to allow it to traverse the entire path of the endless carrier empty and accumulate product until a complete group thereof can be placed in a subsequent carriage 17.

Figure 2:
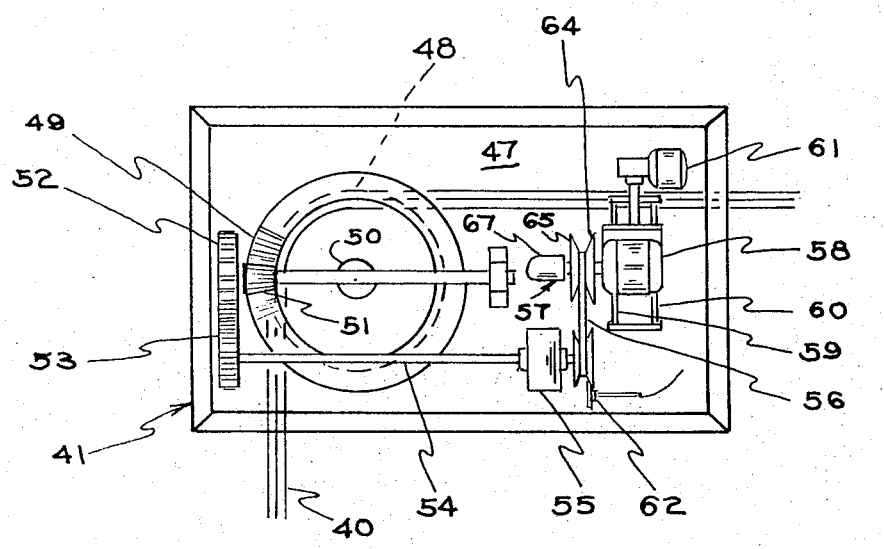
FIG. 2 is a detailed plan view of a drive means of the apparatus of FIG. 1.

As may be seen in FIGS. 2 and 3 each endless carrier generally 11 – 15 comprises a cable 40 and at least one speed controllable power means generally 41, 42, 43, 44, and 45. It is essential that the speed of each endless carrier be controllable independently of all other endless carriers and over a wide range of speeds. As may be seen in FIG. 1 the respective power means generally 41 – 45 are located at turns in the course or path of the respective endless carriers generally 11 – 15. As shown in FIG. 2 each power means (as represented by power means generally 41) comprises a frame 47 that is mounted from the ceiling structure or the like just above a cable sheave 48 about which the cable 40 is turned. A ring gear 49 above the frame 47 is connected to the cable sheave 48 by a stub shaft 50 journalled in the frame. The ring gear 49 is, in turn, driven by a pinion 51 connected to a gear 52 which is driven by a mating gear 53 mounted on a shaft 54 which is, in turn, driven from a gear reducer 55. The gear reducer 55 is powered by a drive belt 56 extending from a variable pitch pulley generally 57 on the shaft of an electric motor 58. The electric motor 58 is, in turn, movably mounted on a pair of rails 59, 60, so as to adjust the distance between the motor shaft and the gear reducer 55. A gear head slave motor 61 is connected to move the electric motor 58 on the rails 59, 60 in accordance with a speed selection made by an operator.

Speed adjustment is made to the input of the gear reducer 55 and may be read by a tachometer 62 connected to the reducer. The speed adjustment is made by altering the effective pitch of the variable pitch pulley generally 57 on the shaft of electric motor 58. Such an item is commercially available and includes a fixed pulley face 64 and a movable pulley face 65, the latter being forced against the action of a spring (not shown) within a housing 67 by the tension imparted by the drive belt 56 due to the positioning of the electric motor 58 on rails 59, 60.

In practice it is preferred that certain of the carriages 17 be sized to accommodate relatively large items of packaged product. Accordingly, all of the carriages 17 on two of the endless carriers 14 and 15 are relatively larger as compared to the carriages on carriers 11, 12 and 13. Because of this, spacing of the respective endless carriers 14, 15 is somewhat greater; and because of the greater load that these endless carriers will transport, each includes auxiliary drives generally 69, 70 (as may be located on FIG. 1.). The auxiliary drives 69, 70 need not be speed controlled if they are made responsive to the speed established by the respective power means 44, 45. Such a characteristic is achieved by substituting a hydraulic drive system for the electric drive system shown in FIG. 2.

Since it is intended that the items of product transported in the carriages generally 17 are to be thermally processed by direct contact of the bodies of liquid in the first and second tanks generally 19, 20, it is preferred that each carriage generally 17 be constructed mainly of foraminous material such as perforated or expanded metal sheeting. As may be seen in FIG. 3 each carriage generally 17 is of rectangular form and may have a top panel 73, end panels 74, 75, and a bottom panel 76, all manufactured from foraminous material. The sides of the carriages generally 17 are left open and an internal cell-work 78 of foraminous material divides the carriage into a plurality of equal compartments. Each carriage generally 17 is suspended by wires or struts 80 from a trolley generally 81 having a frame 82 and support wheel 83. The frame 82 is fastened to the cable 40 and the support wheel 83 rides upon a track beam 84 which is suspended from the ceiling structure of the plant. Carriages of other design would also be sufficient so long as they are adaptable to carrying plural items of differing sizes and are sufficiently open in construction to permit maximum flow of liuqid about the items.

The first tank generally 19, intended for heating the product items, comprises an open-topped rectangular vessel 90 which is divided into a number of channels, equalling the number of endless carriers 11 – 15, by a plurality of divider guide and enclosure panels 91 fastened to overhead suspensions 92. The guide and enclosure panels 91 are of a vertical dimension only slightly less than the vertical dimension of the carriages 17. So as to enable movement of fluid through all portions of the vessel 90 the guide and enclosure panels 91 do not extend to the bottom of the vessel 90 nor to the surface of the body of fluid therein. The guide and enclosure panels 91 exend substantially the full length of the vessel 90 and are spaced therein to receive the carriages generally 17 transported by each of the endless carriers generally 11 – 15 and to loosely enclose the open sides of the carriages 17 as they are moved through the length of the vessel 90. In this way the packaged product items within the carriages generally 17 are prevented from either falling or floating therefrom while the flow of liquid thereabout is substantially unhindered.

A flow control valve 94 is connected to a make-up water line and positioned within the vessel 90 at a level to maintain the fluid level therein at a desired point. Also, a plurality of overflow drains 95 are provided at spaced locations along one or both sides of the vessel 90 and are connected to sewer mains (not shown). The vessel 90 comprises a number of contiguous longitudinal zones each having a steam header 98$A$, 98$B$, 98$C$ which are connected to a plant steam line 99. The amount of steam directed to each respective header is controlled by valves 100$A$, 100$B$, 100$C$ which are actuated by solenoids 101$A$, 101$B$ and 101$C$, respectively. The latter solenoids are each separately controlled by temperature sensing bulbs (not shown) which are located within lengths of perforated pipe 102$A$, 102$B$, and 102$C$ and connected by wires 103$A$, 103$B$, and 103$C$, respectively to sensing units 104$A$, 104$B$, and 104$C$ which, in turn, are connected to operate the respective solenoids 101. As may be seen in FIGS. 4 and 6, the steam headers 98 and temperature sensing pipe 102 are located at the bottom of vessel 90 and at opposite sides thereof. The respective positions of these elements are reverse in each successive zone. That is, the steam headers 98 are positioned alternately at one side and the other for successive zones and each corresponding temperature sensing pipe 102 similarly alternate so as to be opposite the steam header 98 controlled thereby. Preferably the headers 98 are each approximately 40 to 45 feet long, which is roughly the length of a zone.

Additionally, the fluid in vessel 90 is continuously circulated concurrent to the direction of movement of the carriages generally 17 by a pump 108 which is driven by an electric motor 109. The pump 108 is connected to one end of the vessel 90 by a pipe 110 and expansion coupling 111; and is connected to the opposite end of the vessel 90 by a return pipe 112 and expansion coupling 113.

The second tank generally 20 is intended for chilling the product items and is constructed similarly to the first tank generally 19. It comprises a vessel 116 having divider guide and enclosure panels 117 and float control valve 118 and overflow drains 119. Similarly the vessel 116 is provided for continuous recirculation of the fluid therein by means of a pump 120 driven by an electric motor 121. However, for efficient heat transfer it is preferred that the fluid be circulated countercurrent to the movement of carriages 17. Fluid is taken from one end of the vessel 116 through a take-off pipe 122 to the pump 120. An expansion coupling 123 is desirably provided between the vessel 116 and pump 120. Also, fluid is returned to the vessel from the pump 120 through a return pipe 124. However, since it is intended that this fluid be chilled the return pipe 124 is connected to a chiller unit 125. A similar expansion coupling 126 is utilized at the opposite end of vessel 116.

Operation of the system of apparatus will be in accordance with the foregoing detailed description. Each of the endless carriers generally 11 – 15 can be operated at different speeds so as to transport and process different products. For example, with the fluid temperature throughout vessel 90 regulated to be maintained at 170° F. the carriages of endless carrier generally 11 may be loaded with 3 lb. canned ham in 710 × 506 × 300 pear-shaped cans and operated at a speed to traverse vessel 90 in 120 minutes. Endless carrier generally 12 may be loaded with 5 lb. canned hams in 904 × 606 × 308 pear-shaped cans and operated at a speed to traverse vessel 90 in 180 minutes. Endless carrier generally 13 may be loaded with 3 lb. picnic hams in 710 × 506 × 300 pear-shaped cans and operated at a speed to traverse the vessel 90 in 150 minutes. Endless carrier 14 may be loaded with 4 lb. canned hostess hams in cylindrical 502 × 600 cans and the speed regulated to traverse vessel 90 in 180 minutes. Finally, endless carrier generally 13 may be loaded with 13 lb. canned hams in 1,011 × 709 × 600 pear-shaped cans and operated at a speed to traverse the vessel 90 in 6 hours. In another operation the respective endless carriers 11 through 15 may be loaded with 3 lb. pear-shaped cans of hams requiring 120 minutes in vessel 90, 6 lb. pear-shaped cans requiring 225 minutes in vessel 90, 8 lb. pear-shaped cans requiring 205 minutes in vessel 90, and 13 lbs. pear-shaped cans requiring 360 minutes in vessel 90.

Obviously many modifications and variations of the invention as hereinbefore set forth may be made without departing from the spirit and scope thereof, and, therefore, only such limitations should be imposed as are indicated in the appended claims.

We claim:

1. An improved system for continuously thermally processing packaged food items, said system comprising: an endless carrier trained in a closed path; a first elongated tank containing a body of heated liquid beneath a first portion of said path; a second elongated tank containing a body of chilled liquid beneath a second portion of said path; a plurality of open compartmented carriages having open sides suspended equally spaced beneath said endless carrier, said carrier being trained to convey said carriages through said first and second tanks; a plurality of longitudinal guides positioned adjacent the path of said carriages within each of said first and second elongated tanks whereby to confine food items in the compartments of said carriages; a loading station alongside said path in advance of said first tank whereat separate food items are inserted in each of the compartments of said carriages; an unloading station along said path following said second tank whereat said food items are ejected from said carriages; and a variable speed drive means connected to power said endless carrier at a rate selected to provide a desired interval of time for each carriage to traverse the length of said first tank.

2. The system of claim 1 wherein the first tank comprises a series of zones, each zone having a heating means and a temperature sensing means connected to regulate said heating means.

3. The system of claim 2 wherein the heating means is located at a side of said tank opposite said temperature sensing means for each of said zones.

4. The system of claim 3 wherein the temperature sensing means of successive zones alternate from side to side of said tank.

5. The system of claim 4 wherein the first tank has a pump and piping connected thereto for continuously circulating a quantity of liquid throughout the length of said first tank.

6. The system of claim 5 wherein the second tank has a pump and piping connected thereto for continuously circulating a quantity of a body of liquid throughout the length thereof countercurrent to the direction of carrier movement; and a chilling means in said piping.

* * * * *